US011911335B2

(12) United States Patent
Zheng

(10) Patent No.: US 11,911,335 B2
(45) Date of Patent: Feb. 27, 2024

(54) BIDIRECTIONAL RECIPROCATING OSCILLATING MASSAGER

(71) Applicant: Dongguan Xiangyao Electronic Technology Co., Ltd., Dongguan (CN)

(72) Inventor: Xiang Zheng, Dongguan (CN)

(73) Assignee: Dongguan Xiangyao Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/099,975

(22) Filed: Jan. 23, 2023

(65) Prior Publication Data

US 2023/0201075 A1 Jun. 29, 2023

(51) Int. Cl.
*A61H 23/02* (2006.01)

(52) U.S. Cl.
CPC . *A61H 23/0254* (2013.01); *A61H 2201/0153* (2013.01); *A61H 2201/14* (2013.01); *A61H 2201/1669* (2013.01); *A61H 2201/1676* (2013.01); *A61H 2201/1678* (2013.01)

(58) Field of Classification Search
CPC ........ A61H 23/0254; A61H 2201/0153; A61H 2201/14; A61H 2201/1669; A61H 2201/1676; A61H 2201/1678; A61H 1/00
See application file for complete search history.

(56) References Cited

U.S. PATENT DOCUMENTS

| | | | | |
|---|---|---|---|---|
| 11,259,987 | B1 * | 3/2022 | Chen | A61H 19/34 |
| 11,554,073 | B1 * | 1/2023 | Guo | A61H 7/005 |
| 11,633,327 | B1 * | 4/2023 | Wu | A61H 1/00 601/70 |
| 11,826,300 | B1 * | 11/2023 | Zhou | A61H 19/34 |
| 2008/0183114 | A1 * | 7/2008 | Kim | A61H 23/0254 601/99 |
| 2017/0266076 | A1 * | 9/2017 | Chen | A61H 19/34 |
| 2020/0046598 | A1 * | 2/2020 | Shen | A61H 1/00 |
| 2022/0071839 | A1 * | 3/2022 | Huang | A61H 23/02 |

FOREIGN PATENT DOCUMENTS

| | | | |
|---|---|---|---|
| KR | 20190075862 A * | 4/2019 | |
| WO | WO-2014059669 A1 * | 4/2014 | A61H 1/005 |

* cited by examiner

*Primary Examiner* — Timothy A Stanis
*Assistant Examiner* — Matthew R Moon
(74) *Attorney, Agent, or Firm* — Zhigang Ma

(57) ABSTRACT

The present disclosure relates to a bidirectional reciprocating oscillating massager, including a peripheral component, wherein a first gear box fixing member and a second gear box fixing member are respectively arranged inside the peripheral component; the first gear box fixing member and the second gear box fixing member are connected through a bolt; rotating slots are formed in tops of both the first gear box fixing member and the second gear box fixing member; inner walls of the rotating slots are rotatably connected with driven shafts; outer walls of the driven shafts are sleeved with driven teeth; the same motor is fixedly connected inside the first gear box fixing member and the second gear box fixing member; an output shaft of the motor is connected with a driving tooth; and the driving tooth are meshed with the driven teeth.

7 Claims, 8 Drawing Sheets

BIDIRECTIONAL RECIPROCATING OSCILLATING MASSAGER

TECHNICAL FIELD

The present disclosure relates to the technical field of adult health products, in particular to a bidirectional reciprocating oscillating massager.

BACKGROUND

With the improvement of living standards and the increase of people's life and work pressure, adult health care products are increasingly popular, and people are also putting more and more energy into their own health and comfort in life. In this environment, a variety of health care and massage products specifically for adults have been promoted and applied, among which, a simulated female massager is common, which provides a possibility of releasing some pressure for single adult females or females who have been separated from their spouses for a long time.

In the existing market, an oscillating massager for sex toys is generally composed of a motor and an oscillating mechanism. The motor works to drive the oscillating mechanism to move to achieve a massage function. The oscillating mechanism always moves in one direction.

The existing technical solution mentioned above has the following defects: The function is relatively simple. Although there are bidirectional reciprocating oscillating massagers in the market, these bidirectional reciprocating oscillating massagers have a complex structure and low assembling efficiency, leading to low transmission efficiency, extremely high loss of a force and high cost. Therefore, there is a room for improvement.

SUMMARY

The present disclosure aims to solve the defects in the prior art and provide a bidirectional reciprocating oscillating massager. The bidirectional reciprocating oscillating massager has the following advantages: An oscillating motion in two directions is achieved by one motor. This structural principle is easy to implement, and the bidirectional reciprocating oscillating massager is easy to assemble, has smaller noise, extremely low loss of a force and high transmission efficiency, and has lower cost than that of the same motion manner The above-mentioned invention objective of the present disclosure is achieved by the following technical solution.

A bidirectional reciprocating oscillating massager includes a peripheral component, wherein a first gear box fixing member and a second gear box fixing member are respectively arranged inside the peripheral component; the first gear box fixing member and the second gear box fixing member are connected through a bolt; rotating slots are formed in tops of both the first gear box fixing member and the second gear box fixing member; inner walls of the rotating slots are rotatably connected with driven shafts; outer walls of the driven shafts are sleeved with driven teeth; the same motor is fixedly connected inside the first gear box fixing member and the second gear box fixing member; an output shaft of the motor is connected with a driving tooth; the driving tooth is meshed with the driven teeth; an eccentric shaft is arranged at a top of one side of each driven tooth close to the driven shaft; the two eccentric shafts are assembled in a diagonal manner; the two driven teeth are assembled in the first gear box fixing member and the second gear box fixing member; oscillating members are arranged at tops of the eccentric shafts; tops of the oscillating members are rotatably connected with fixing sleeves; and inner walls of the fixing sleeves are fixedly connected with swing pillars.

By the adoption of the above technical solution, during use, the motor is controlled to work, which can drive the driving tooth to rotate. The driving tooth rotates to drive the driven teeth to rotate. The driven teeth can rotate to drive the eccentric shafts to rotate. The eccentric shafts can rotate to drive the oscillating members to oscillate. The oscillating members can oscillate to drive the swing pillars to swing. The swing pillars cooperate with the peripheral component during swinging to complete massage. An oscillating motion in two directions is achieved by one motor. This structural principle is easy to implement, and the bidirectional reciprocating oscillating massager is easy to assemble, has smaller noise, extremely low loss of a force and high transmission efficiency, and has lower cost than that of the same motion manner.

In a further setting of the present disclosure, the oscillating members and the fixing sleeves are connected through rotating columns; and buffer rings are arranged on outer walls of the rotating columns.

By the adoption of the above technical solution, when the oscillating members oscillate, the fixing sleeves can rotate along the rotating columns. When the fixing sleeves rotate, the buffer rings can achieve a good buffer effect, which can reduce wear between the oscillating members and the fixing sleeves.

In a further setting of the present disclosure, the buffer rings are made of rubber; and the two driven teeth are one kind of bevel gears, helical gears and worm gear straight teeth.

By the adoption of the above technical solution, the rubber buffer rings have a better buffer effect, which further improves the wear resistance effect.

In a further setting of the present disclosure, top ends of the first gear box fixing member and the second gear box fixing member are provided with the same snap rings; and the snap rings clamp the first gear box fixing member to the second gear box fixing member together.

By the adoption of the above technical solution, due to the arrangement of the snap rings, the first gear box fixing member and the second gear box fixing member can be connected more tightly, which can avoid such a phenomenon that the first gear box fixing member and the second gear box fixing member are loosened.

In a further setting of the present disclosure, the peripheral component includes a first shell; a massage head hood is arranged on an outer wall of the first shell; the massage head hood covers the swing pillars; a first tail cover and a second tail cover are respectively arranged inside a bottom end of the first shell; fixing slots are formed in outer walls of opposite sides of the first tail cover and the second tail cover; inner walls of the fixing slots are embedded to a switch button; a connecting pipe is arranged in a middle portion of the first shell; the connecting pipe is of an arc-shaped structure; a first end cover and a second end cover are respectively arranged inside the top end of the first shell; and middle portions of the first end cover and the second end cover are connected with the same vibration motor.

By the adoption of the above technical solution, the swing pillars can swing to achieve massage through the massage head hood. In addition, the vibration motor is controlled to work to transmit a vibration force to the first end cover and the second end cover, so that massage can be also achieved by the top end of the first shell, and multiple parts can be massaged during use, which brings a user a stronger sense of comfort and increases the interest in use of the user.

In a further setting of the present disclosure, handheld slots penetrating through the first tail cover and the second tail cover are formed in outer walls of the first tail cover and the second tail cover; and inner walls of the handheld slots are respectively fixedly connected with a first inbuilt cover and a second inbuilt cover.

By the adoption of the above technical solution, due to the arrangement of the handheld slots, it can be convenient for holding the massager with hands during use, so as to avoid a slip phenomenon, which improves the holding stability.

In a further setting of the present disclosure, a storage battery is arranged inside the first tail cover and the second tail cover; and the storage battery is charged through a charging head.

By the adoption of the above technical solution, due to the arrangement of the storage battery, it can be convenient for supplying power to the massager, which improves the convenience of use.

In a further setting of the present disclosure, the peripheral component includes a second shell; a massage head hood is arranged at a top of the second shell; the massage head hood can cover the swing pillars; a first protective shell and a second protective shell are respectively arranged inside the second shell; the same outer sealing hood is arranged at tops of the first protective shell and the second protective shell; an outer sealing ring is arranged at an edge of a top end of the outer sealing hood; an inner sealing hood is arranged inside the outer sealing hood; and an inner sealing ring is arranged at an edge of a top end of the inner sealing hood.

By the adoption of the above technical solution, during use, the inner sealing ring can be in contact with the skin of the user, so that a part to be massaged can be covered in the inner sealing cover to achieve a vacuum state. The swing pillars swing to massage this part through the massage head hood, which enhances the massage effect.

In a further setting of the present disclosure, a first connecting rod is arranged at a bottom of the second shell; and a first massage head is arranged at a bottom end of the first connecting rod.

By the adoption of the above technical solution, due to the arrangement of the first massage head, the first massage head can be in contact with a position to be massaged for vibration massage, which can meet different massage requirements of the user.

In a further setting of the present disclosure, a second connecting rod is arranged at a bottom of the second shell; and a second massage head is arranged at a bottom end of the second connecting rod.

By the adoption of the above technical solution, due to the arrangement of the second massage head, the second massage head can be in contact with a position to be massaged for vibration massage, which can meet different massage requirements of the user.

In summary, the present disclosure has the following beneficial technical effects:

1. During use, the motor is controlled to work, which can drive the driving tooth to rotate. The driving tooth rotates to drive the driven teeth to rotate. The driven teeth rotate to drive the eccentric shafts to rotate. The eccentric shafts can rotate to drive the oscillating members to oscillate. The oscillating members can oscillate to drive the swing pillars to swing. The swing pillars cooperate with the peripheral component during swinging to complete massage. An oscillating motion in two directions is achieved by one motor. This structural principle is easy to implement, and the bidirectional reciprocating oscillating massager is easy to assemble, has smaller noise, extremely low loss of a force and high transmission efficiency, and has lower cost than that of the same motion manner.

2. When the oscillating members oscillate, the fixing sleeves can rotate along the rotating columns. When the fixing sleeves rotate, the buffer rings can achieve a good buffer effect, which can reduce wear between the oscillating members and the fixing sleeves. The rubber buffer rings have a better buffer effect, which further improves the wear resistance effect. The snap rings can make the first gear box fixing member and the second gear box fixing member connected more tightly, which can avoid such a phenomenon that the first gear box fixing member and the second gear box fixing member are loosened.

3. The swing pillars can swing to achieve massage through the massage head hood. In addition, the vibration motor is controlled to work to transmit a vibration force to the first end cover and the second end cover, so that massage can be also achieved by the top end of the first shell, and multiple parts can be massaged during use, which brings a user a stronger sense of comfort and increases the interest in use of the user. The handheld slots can be convenient for holding the massager with hands during use, so as to avoid a slip phenomenon, which improves the holding stability.

Figure 1:
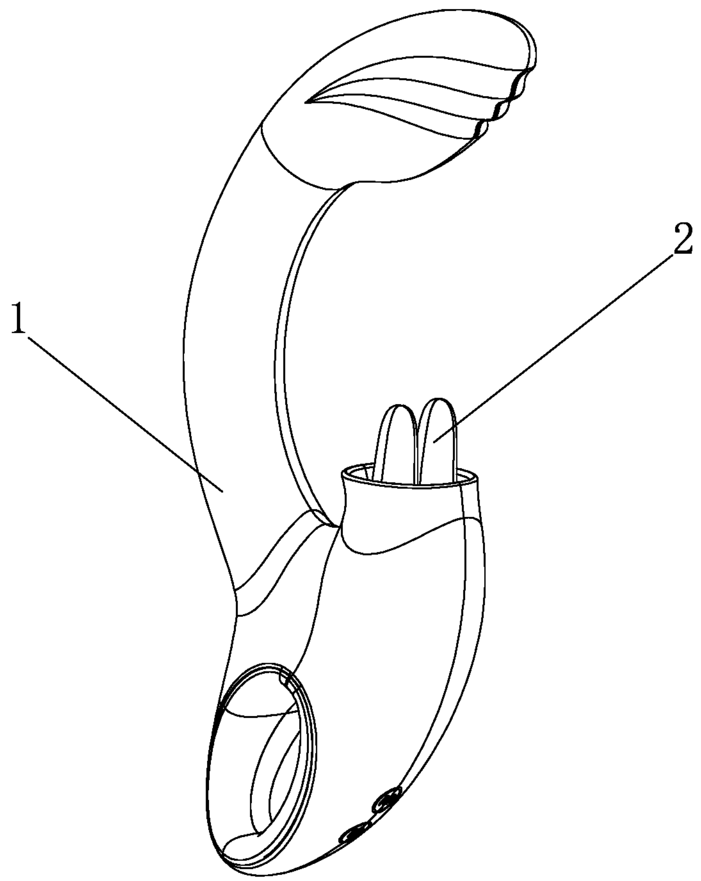
FIG. 1 a three-dimensional schematic structural diagram of Embodiment 1 of the present disclosure.
Figure 2:
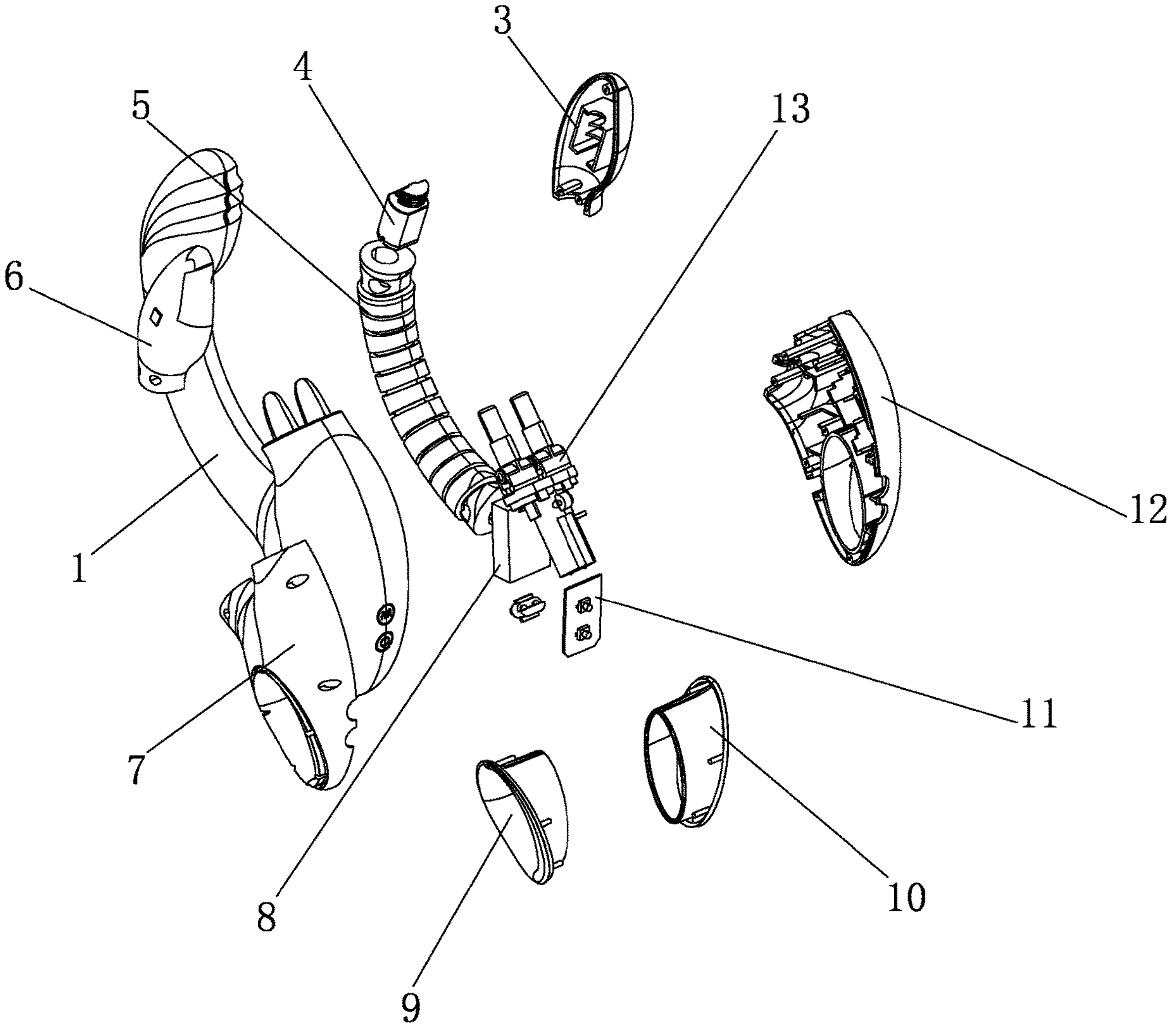
FIG. 2 a schematic exploded structural diagram of Embodiment 1 of the present disclosure.
Figure 3:
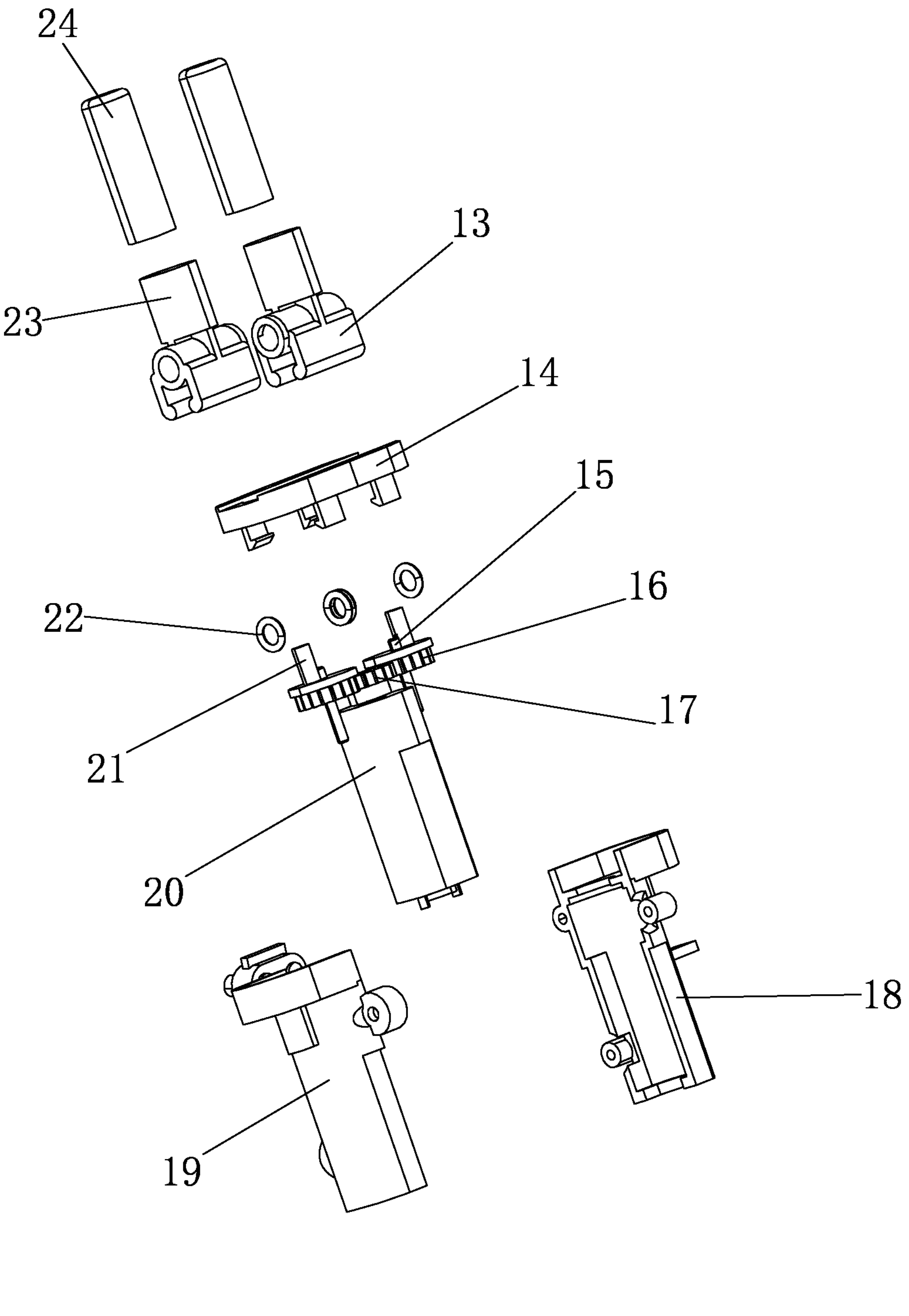
FIG. 3 is a schematic exploded structural diagram of highlighting a first gear box fixing member and a second gear box fixing member of the present disclosure.
Figure 4:
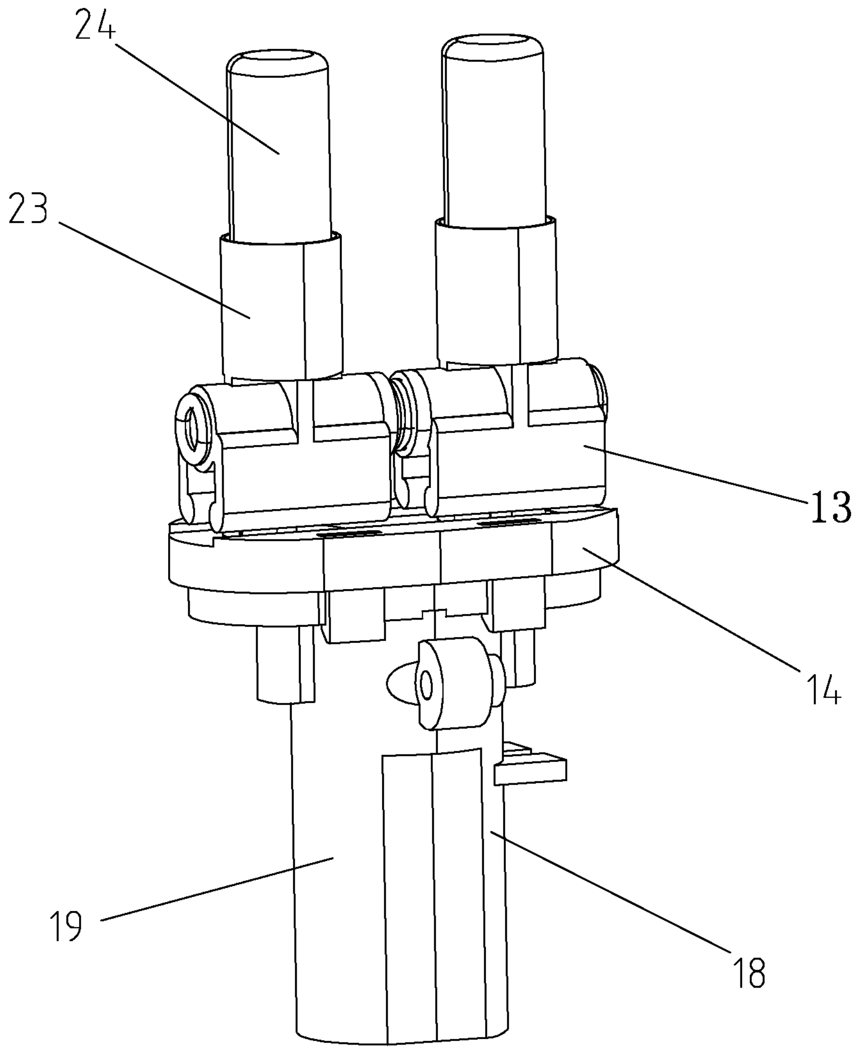
FIG. 4 is a three-dimensional schematic structural diagram of highlighting a first gear box fixing member and a second gear box fixing member of the present disclosure.
Figure 5:
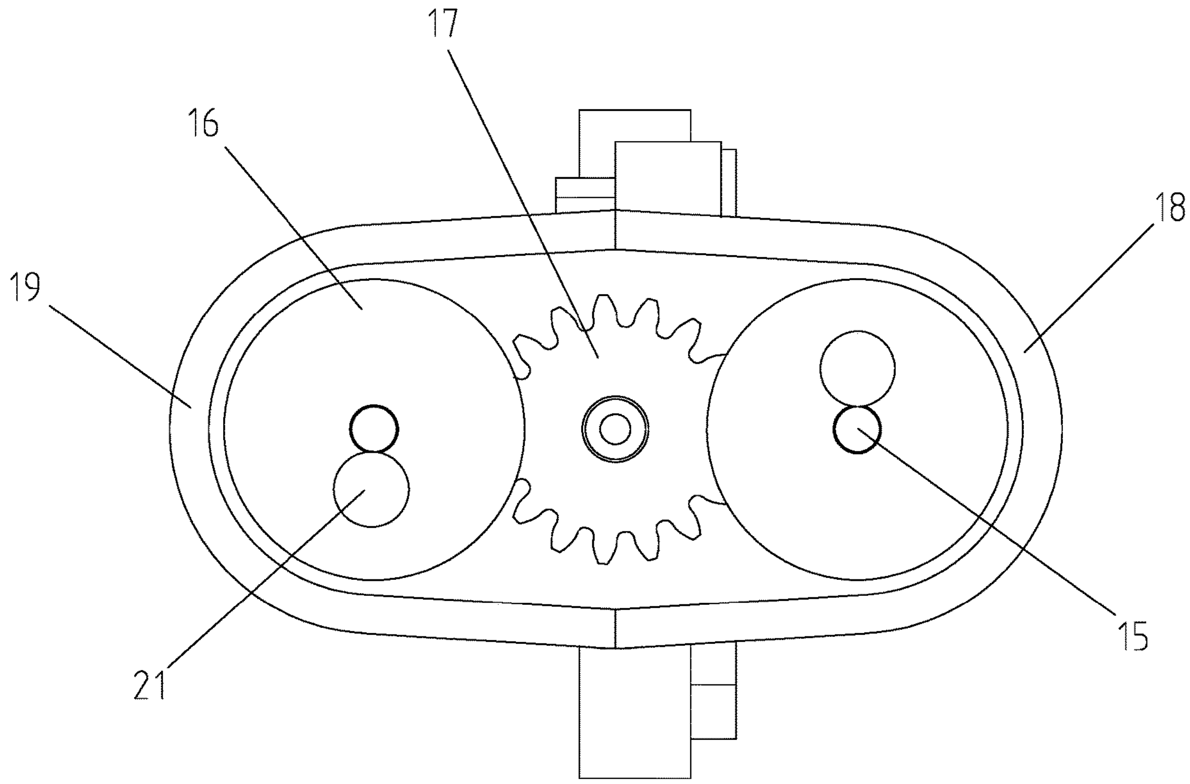
FIG. 5 is a schematic structural diagram of a top view of highlighting a driving tooth and driven teeth of the present disclosure.

In the drawings: 1: first shell; 2: massage head hood; 3: first end cover; 4: vibration motor; 5: connecting pipe; 6: second end cover; 7: first tail cover; 8: storage battery; 9: first inbuilt cover; 10: second inbuilt cover; 11: switch button; 12: second tail cover; 13: oscillating member; 14: snap ring; 15: driven shaft; 16: driven tooth; 17: driving tooth; 18: first gear box fixing member; 19: second gear box fixing member; 20: motor; 21: eccentric shaft; 22: buffer ring; 23: fixing sleeve; 24: swing pillar; 25: inner sealing ring; 26: outer sealing ring; 27: inner sealing hood; 28: outer sealing hood; 29: second shell; 30: first protective shell; 31: second protective shell; 32: first connecting rod; 33: first massage head; 34: second connecting rod; and 35: second massage head.

DETAILED DESCRIPTION OF THE EMBODIMENTS

The present disclosure is further described in detail below in combination with accompanying drawings.

Referring to FIG. 1 to FIG. 5, a bidirectional reciprocating oscillating massager disclosed by the present disclosure includes a peripheral component. A first gear box fixing member 18 and a second gear box fixing member 19 are respectively arranged inside the peripheral component. The first gear box fixing member 18 and the second gear box fixing member 19 are connected through a bolt. Rotating slots are formed in tops of both the first gear box fixing member 18 and the second gear box fixing member 19. Inner walls of the rotating slots are rotatably connected with driven shafts 15. Outer walls of the driven shafts 15 are sleeved with driven teeth 16. The same motor 20 is fixedly connected inside the first gear box fixing member 18 and the second gear box fixing member 19. An output shaft of the motor 20 is connected with a driving tooth 17. The driving tooth 17 is meshed with the driven teeth 16. An eccentric shaft 21 is arranged at a top of one side of each driven tooth 16 close to the driven shaft 15. The two eccentric shafts 21 are assembled in a diagonal manner. The two driven teeth 16 are assembled in the first gear box fixing member 18 and the second gear box fixing member 19. Oscillating members 13 are arranged at tops of the eccentric shafts 21. Tops of the oscillating members 13 are rotatably connected with fixing sleeves 23. Inner walls of the fixing sleeves 23 are fixedly connected with swing pillars 24. The two driven teeth 16 are one kind of bevel gears, helical gears and worm gear straight teeth.

In this embodiment, the oscillating members 13 and the fixing sleeves 23 are connected by rotating columns, and buffer rings 22 are arranged on outer walls of the rotating columns When the oscillating members 13 oscillate, the fixing sleeves 23 can rotate along the rotating columns. When the fixing sleeves 23 rotate, the buffer rings 22 can achieve a good buffer effect, which can reduce wear between the oscillating members 13 and the fixing sleeves 23. The buffer rings 22 are made of rubber. The rubber buffer rings 22 have a better buffer effect, which further improves the wear resistance effect.

Top ends of the first gear box fixing member 18 and the second gear box fixing member 19 are provided with the same snap rings 14. The snap rings 14 clamp the first gear box fixing member 18 to the second gear box fixing member 19 together. The snap rings 14 can make the first gear box fixing member 18 and the second gear box fixing member 19 connected more tightly, which can avoid such a phenomenon that the first gear box fixing member 18 and the second gear box fixing member 19 are loosened.

Further, the peripheral component includes a first shell 1. A massage head hood 2 is arranged on an outer wall of the first shell 1. The massage head hood 2 covers the swing pillars 24. A first tail cover 7 and a second tail cover 12 are respectively arranged inside a bottom end of the first shell 1. Fixing slots are formed in outer walls of opposite sides of the first tail cover 7 and the second tail cover 12. Inner walls of the fixing slots are embedded to a switch button 11. A connecting pipe 5 is arranged in a middle portion of the first shell 1. The connecting pipe 5 is of an arc-shaped structure. A first end cover 3 and a second end cover 6 are respectively arranged inside the top end of the first shell 1. Middle portions of the first end cover 3 and the second end cover 6 are connected with the same vibration motor 4. The swing pillars 24 can swing to achieve massage through the massage head hood 2. In addition, the vibration motor 4 is controlled to work to transmit a vibration force to the first end cover 3 and the second end cover 6, so that massage can be also achieved by the top end of the first shell 1, and multiple parts can be massaged during use, which brings a user a stronger sense of comfort and increases the interest in use of the user.

It is worth mentioning that handheld slots penetrating through the first tail cover 7 and the second tail cover 12 are formed in outer walls of the first tail cover 7 and the second tail cover 12. Inner walls of the handheld slots are respectively fixedly connected with a first inbuilt cover 9 and a second inbuilt cover 10. Due to the handheld slots, it can be convenient for holding the massager with hands during use, so as to avoid a slip phenomenon, which improves the holding stability.

A storage battery 8 is arranged inside the first tail cover 7 and the second tail cover 12. The storage battery 8 is charged through a charging head. Due to the storage battery 8, it can be convenient for supplying power to the massager, which improves the convenience of use.

Embodiment 2

Figure 6:
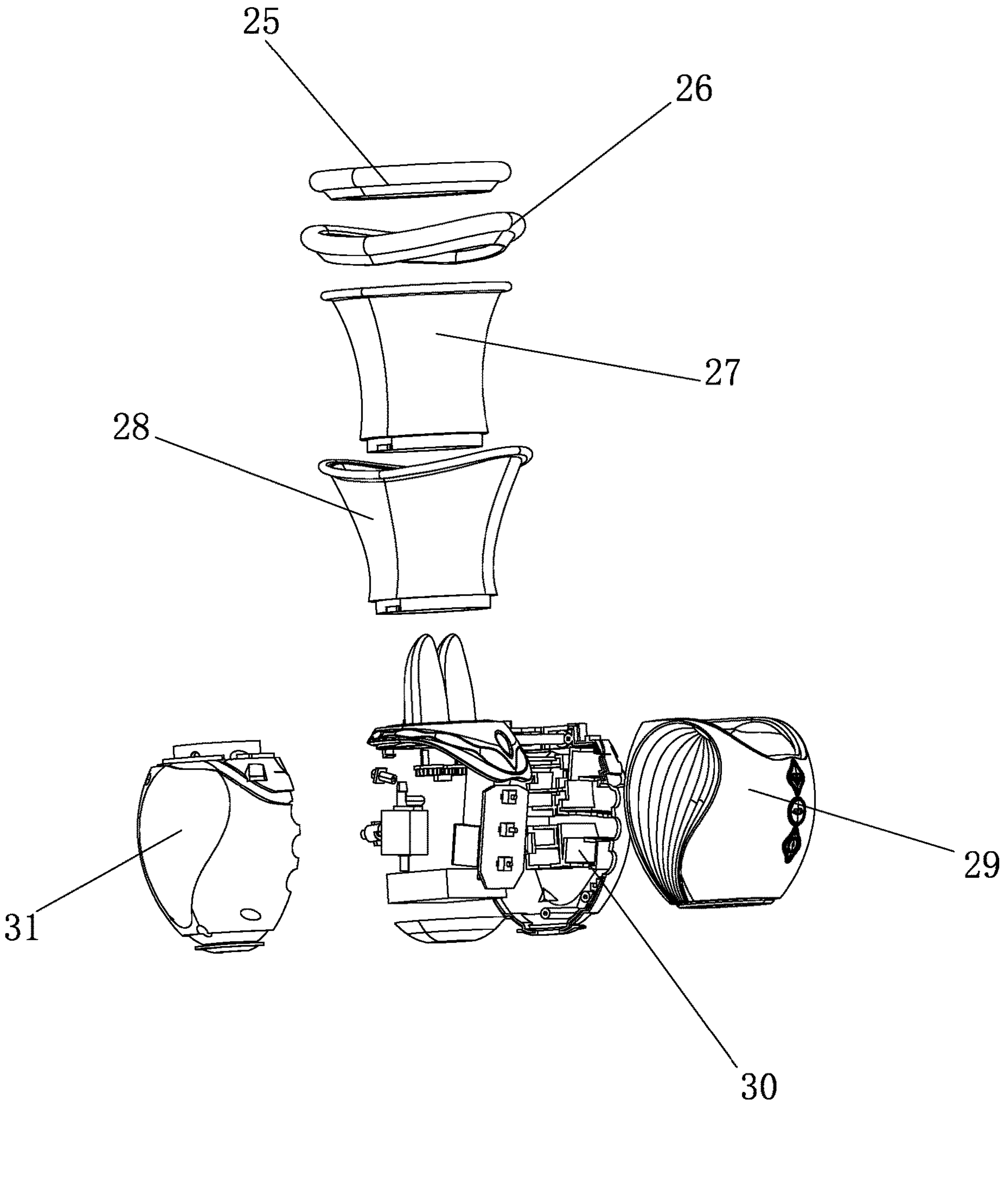
FIG. 6 a schematic exploded structural diagram of Embodiment 2 of the present disclosure.

Referring to FIG. 6, a bidirectional reciprocating oscillating massager is shown. Compared with Embodiment 1, this embodiment is further as follows: The peripheral component includes a second shell 29. A massage head hood 2 is arranged at a top of the second shell 29. The massage head hood 2 can cover the swing pillars 24. A first protective shell 30 and a second protective shell 31 are respectively arranged inside the second shell 29. The same outer sealing hood 28 is arranged at tops of the first protective shell 30 and the second protective shell 31. An outer sealing ring 26 is arranged at an edge of a top end of the outer sealing hood 28. An inner sealing hood 27 is arranged inside the outer sealing hood 28. An inner sealing ring 25 is arranged at an edge of a top end of the inner sealing hood 27. During use, the inner sealing ring 25 can be in contact with the skin of a user, so that a part to be massaged can be covered in the inner sealing cover 27 to achieve a vacuum state. The swing pillars 24 swing to massage this part through the massage head hood 2, which enhances the massage effect.

Embodiment 3

Figure 7:
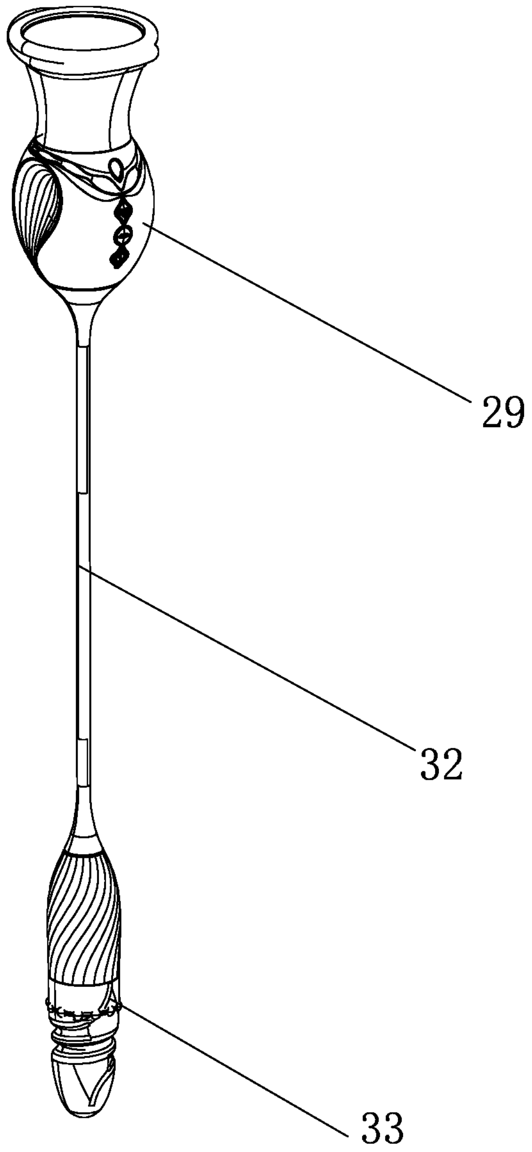
FIG. 7 a three-dimensional schematic structural diagram of Embodiment 3 of the present disclosure.

Referring to FIG. 7, a bidirectional reciprocating oscillating massager is shown. Compared with Embodiment 2, this embodiment is further as follows: a first connecting rod 32 is arranged at a bottom of the second shell 29. A first massage head 33 is arranged at a bottom end of the first connecting rod 32. Due to the first massage head 33, the first massage head 33 can be in contact with a position to be massaged for vibration massage, which can meet different massage requirements of a user.

Embodiment 4

Figure 8:
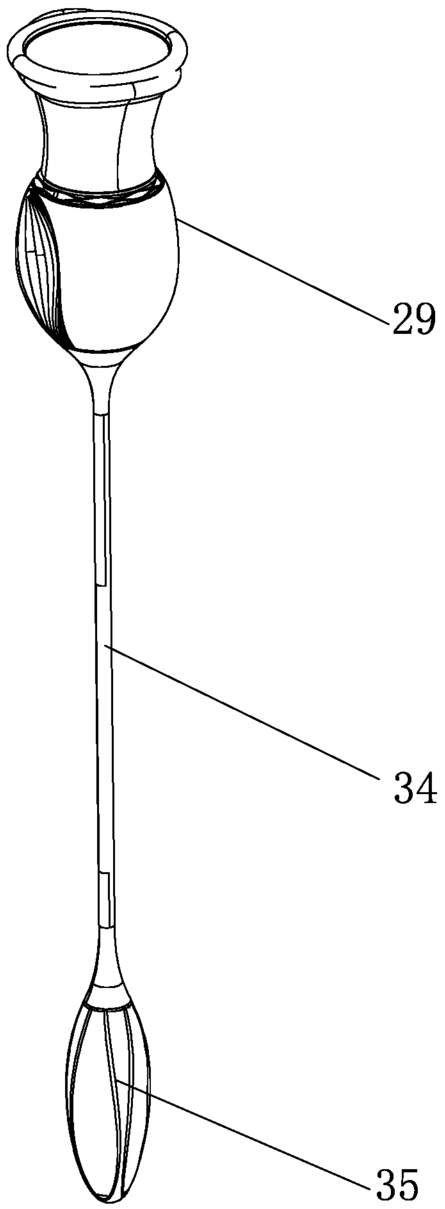
FIG. 8 a three-dimensional schematic structural diagram of Embodiment 4 of the present disclosure.

Referring to FIG. 8, a bidirectional reciprocating oscillating massager is shown. Compared with Embodiment 2, this embodiment is further as follows: a second connecting rod 34 is arranged at a bottom of the second shell 29. A second massage head 35 is arranged at a bottom end of the second connecting rod 34. Due to the second massage head 35, the second massage head 35 can be in contact with a position to be massaged for vibration massage, which can meet different massage requirements of the user.

The implementation principle of this embodiment is as follows: During use, the motor 20 is controlled to work, which can drive the driving tooth 17 to rotate. The driving tooth 17 rotates to drive the driven teeth 16 to rotate. The driven teeth 16 can rotate to drive the eccentric shafts 21 to rotate. The eccentric shafts 21 can rotate to drive the oscillating members 13 to oscillate. The oscillating members 13 can oscillate to drive the swing pillars 24 to swing. The swing pillars 24 cooperate with the peripheral component during swinging to complete massage. An oscillating motion in two directions is achieved by one motor 20. This structural principle is easy to implement, and the bidirectional reciprocating oscillating massager is easy to assemble, has smaller noise, extremely low loss of a force and high transmission efficiency, and has lower cost than that of the same motion manner.

The embodiments of this specific implementation are all preferred embodiments of the present disclosure, and are not intended to limit the protection scope of the present disclosure. Therefore, any equivalent changes made according to the structure, shape and principle of the present disclosure shall all fall within the protection scope of the present disclosure.

What is claimed is:

1. A bidirectional reciprocating oscillating massager, comprising a peripheral component, wherein a first gear box fixing member (18) and a second gear box fixing member (19) are respectively arranged inside the peripheral component; the first gear box fixing member (18) and the second gear box fixing member (19) are connected; rotating slots are fooned in tops of both the first gear box fixing member (18) and the second gear box fixing member (19); inner walls of the rotating slots are rotatably connected with driven shafts (15); outer walls of the driven shafts (15) are sleeved with driven teeth (16); a motor (20) is fixedly connected inside the first gear box fixing member (18) and the second gear box fixing member (19); an output shaft of the motor (20) is connected with a driving tooth (17); the driving tooth (17) is meshed with the driven teeth (16); an eccentric shaft (21) is arranged at a top of one side of each driven tooth (16) close to the driven shaft (15); the two eccentric shafts (21) are assembled in a diagonal manner; the two driven teeth (16) are assembled in the first gear box fixing member (18) and the second gear box fixing member (19); oscillating members (13) are arranged at tops of the eccentric shafts (21); tops of the oscillating members (13) are rotatably connected with fixing sleeves (23); and inner walls of the fixing sleeves (23) are fixedly connected with swing pillars (24); wherein the peripheral component comprises a first shell (1); a massage head hood (2) is arranged on an outer wall of a bottom end of the first shell (1); the massage head hood (2) covers the swing pillars (24); a first tail cover (7) and a second tail cover (12) are respectively arranged inside the bottom end of the first shell (1); a first end cover (3) and a second end cover (6) are respectively arranged inside a top end of the first shell (1) away from the bottom end of the first shell (1); and middle portions of the first end cover (3) and the second end cover (6) are connected with a vibration motor (4).

2. The bidirectional reciprocating oscillating massager according to claim 1, wherein the oscillating members (13) and the fixing sleeves (23) are connected through rotating columns; buffer rings (22) are arranged on outer walls of the rotating columns and configured to reduce wear between the oscillating members (13) and the fixing sleeves (23); and the buffer rings (22) are made of rubber.

3. The bidirectional reciprocating oscillating massager according to claim 2, wherein top ends of the first gear box fixing member (18) and the second gear box fixing member (19) are provided with a snap ring (14); and the snap ring (14) clamps the first gear box fixing member (18) to the second gear box fixing member (19) together.

4. The bidirectional reciprocating oscillating massager according to claim 1, wherein the two driven teeth (16) are one kind of bevel gears, helical gears and worm gear straight teeth.

5. The bidirectional reciprocating oscillating massager according to claim 1, wherein fixing slots are fouined in outer walls of opposite sides of the first tail cover (7) and the second tail cover (12); inner walls of the fixing slots are embedded to a switch button (11); a connecting pipe (5) is arranged in a middle portion connected between the top end and the bottom end of the first shell (1); both the middle portion of the first shell and the connecting pipe (5) is of an arc-shaped structure.

6. The bidirectional reciprocating oscillating massager according to claim 5, wherein handheld slots penetrating through the first tail cover (7) and the second tail cover (12) are formed in outer walls of the first tail cover (7) and the second tail cover (12); and inner walls of the handheld slots are respectively fixedly connected with a first inbuilt cover (9) and a second inbuilt cover (10), each of the first inbuilt cover (9) and the second inbuilt cover (10) defines a through hole communicating the handheld slots to allow a user to hold the massager through the handheld slots.

7. The bidirectional reciprocating oscillating massager according to claim 6, wherein a storage battery (8) is arranged inside the first tail cover (7) and the second tail cover (12); and the storage battery (8) is charged through a charging head.

* * * * *